United States Patent
Ohata et al.

(10) Patent No.: US 7,670,717 B2
(45) Date of Patent: Mar. 2, 2010

(54) SPIRALLY-WOUND NON-AQUEOUS SECONDARY BATTERY AND ELECTRODE PLATE USED THEREFOR

(75) Inventors: Tsumoru Ohata, Kyoto (JP); Junji Nakajima, Osaka (JP)

(73) Assignee: Panasonic Corporation, Osaka (JP)

( * ) Notice: Subject to any disclaimer, the term of this patent is extended or adjusted under 35 U.S.C. 154(b) by 1315 days.

(21) Appl. No.: 11/136,566

(22) Filed: May 25, 2005

(65) Prior Publication Data
US 2005/0266305 A1  Dec. 1, 2005

(30) Foreign Application Priority Data
May 27, 2004  (JP) ............... 2004-157671

(51) Int. Cl.
*H01M 2/16* (2006.01)
(52) U.S. Cl. .............. 429/144; 429/209; 429/233; 429/246; 427/58; 427/126.1; 427/123
(58) Field of Classification Search ............... 429/144, 429/209, 233, 246; 427/58, 126.1, 123
See application file for complete search history.

(56) References Cited

U.S. PATENT DOCUMENTS

| 6,365,299 | B1 |   | 4/2002 | Miyaki et al. |   |
|---|---|---|---|---|---|
| 6,824,922 | B2 | * | 11/2004 | Park et al. ............. | 429/231.1 |
| 2005/0266150 | A1 | * | 12/2005 | Yong et al. ............. | 429/209 |

FOREIGN PATENT DOCUMENTS

| JP | 07-220759 | 8/1995 |
|---|---|---|
| JP | 2000-133251 | 5/2000 |
| JP | 2000-331675 | 11/2000 |
| JP | 2001-266828 | 9/2001 |
| JP | 2001-345096 | 12/2001 |
| JP | 2003-208918 | 7/2003 |

OTHER PUBLICATIONS

European Search Report issued in European Patent Application No. EP 05741291.8, mailed Apr. 2, 2009.

* cited by examiner

*Primary Examiner*—Laura S Weiner
(74) *Attorney, Agent, or Firm*—McDermott Will & Emery LLP

(57) ABSTRACT

To provide a non-aqueous secondary battery having a capacity as high as that of a conventional battery using a conventional resin separator and achieving excellent overcharge characteristics and excellent resistance to external short-circuit, a combined electrode plate for a spirally-wound electrode group for a non-aqueous secondary battery including a current collector, an active material layer carried on the current collector and a multi-layer porous membrane carried on the active material layer is used. The multi-layer porous membrane includes a first porous membrane and a second porous membrane. The first porous membrane contains metal oxide particles and a first binder. The second porous membrane contains resin particles and a second binder. The thickness of the multi-layer porous membrane is preferably 15 to 25 μm.

4 Claims, 2 Drawing Sheets

SPIRALLY-WOUND NON-AQUEOUS SECONDARY BATTERY AND ELECTRODE PLATE USED THEREFOR

FIELD OF THE INVENTION

The present invention relates to a high capacity non-aqueous secondary battery with a spirally-wound electrode group excellent in safety and discharge characteristics, particularly to an electrode plate used therefor and a method for producing the same.

BACKGROUND OF THE INVENTION

As the power sources for portable electronic equipment, non-aqueous secondary batteries that have a high capacity and are light in weight, namely, lithium ion secondary batteries, are widely used in recent years. A non-aqueous secondary battery has a porous separator made of resin for electrically insulating positive and negative electrodes from each other and for retaining a non-aqueous electrolyte. The resin separator melts when the battery temperature is too high, and clog the micropores thereof. This prevents the migration of ions through the electrolyte, and hence the safety of the battery is maintained. Such function of the separator is called shut-down function. A resin separator is usually made of a resin susceptible to thermal deformation such as polyolefin resin.

When a battery is charged to have more than its nominal capacity, in other words, when overcharge is performed, the battery temperature might be very high. In such case, the separator's shut-down function is expected to work. However, when a current during overcharge is relatively large, the battery temperature might increase suddenly and the separator sometimes shrinks to smaller than the positive and negative electrodes in width. This allows the positive and negative electrodes whose reactivity has been increased to contact with each other, which might accelerate overheating.

In an attempt to overcome the above problem while the conventional shut-down function is maintained, Japanese Laid-Open Patent Publication No. 2001-266828 (Patent Document 1) proposes a separator comprising an inorganic porous membrane containing inorganic powders and having high thermal resistance and an organic porous membrane made of a polyolefin resin alternately laminated. The organic porous membrane is produced by mixing a polyolefin resin, inorganic powders and an appropriate amount of an organic plasticizer, which is kneaded with heating and formed into a sheet, from which the inorganic powders and the organic plasticizer are extracted. In this production method, the organic porous membrane will have a large micropore volume ratio (porosity), and therefore it becomes brittle in structure. As such, considering the battery producing process, particularly the ease of handling during the step of spirally winding the positive and negative electrodes with the separator interposed therebetween, the separator including the inorganic porous membrane and the organic porous membrane is required to have a very large thickness, namely, not less than 40 μm. Accordingly, it is difficult to achieve a battery having a capacity as high as that of a battery using a conventional separator with a thickness of about 15 to 30 μm. In the case of Patent Document 1, the capacity ratio of high rate discharge to low rate discharge will also be low.

As a means to enhance safety during an abnormal increase of battery temperature due to overcharge while maintaining a high capacity, there is a method in which a slurry containing a metal oxide filler and a resin binder is applied onto the surface of an electrode plate by an ordinary printing method, followed by drying with hot air to form a porous membrane, for example. This method has the advantage of low material cost and low production cost. Moreover, even if the battery is short-circuited due to the penetration of a nail or the like, because the metal oxide filler has high thermal resistance, the extension of the short-circuited area will be prevented. Accordingly, the above-described method ensures a high level of safety. When using only a conventional separator, the short-circuited area is extended along with heat generation, which might contribute to further heat generation.

In the case of the porous membrane containing a metal oxide filler and a resin binder, however, because the metal oxide filler contributes to maintain porosity of the membrane even during an abnormal increase of the battery temperature, although the resin binder melts, the migration of ions through the electrolyte cannot be prevented, which means the shut-down function might not work properly.

BRIEF SUMMARY OF THE INVENTION

The present invention relates to a combined electrode plate for a spirally-wound electrode group for a non-aqueous secondary battery comprising a current collector, an active material layer carried on the current collector and a multi-layer porous membrane carried on the active material layer, wherein the multi-layer porous membrane includes a first porous membrane and a second porous membrane, the first porous membrane contains metal oxide particles and a first binder, and the second porous membrane contains resin particles and a second binder.

The multi-layer porous membrane preferably has a thickness of 15 to 25 μm.

The present invention further relates to a method for producing a combined electrode plate for a spirally-wound electrode group for a non-aqueous secondary battery comprising the steps of: applying a first slurry onto the active material layer of an original electrode plate to form a first porous membrane, the first slurry containing metal oxide particles and a first binder, the original electrode plate comprising a current collector and an active material layer carried on the current collector; and applying a second slurry onto the first porous membrane to form a second porous membrane, the second slurry containing resin particles and a second binder.

The production method preferably further includes a step of adjusting the density of the active material layer prior to the step of forming the first porous membrane.

The present invention further relates to a method for producing a combined electrode plate for a spirally-wound electrode group for a non-aqueous secondary battery comprising the steps of: applying a second slurry onto the active material layer of an original electrode plate to form a second porous membrane, the second slurry containing resin particles and a second binder, the original electrode plate comprising a current collector and an active material layer carried on the current collector; and applying a first slurry onto the second porous membrane to form a first porous membrane, the first slurry containing metal oxide particles and a first binder.

The production method preferably further includes a step of adjusting the density of the active material layer prior to the step of forming the second porous membrane.

The step of forming the first porous membrane and the step of forming the second porous membrane preferably comprise the steps of: introducing the first slurry and the second slurry into a two-slit die nozzle having two slits for simultaneously ejecting the two slurries; and simultaneously ejecting the first slurry and the second slurry from the two slits to simultaneously form the first porous membrane and the second porous membrane.

The present invention further relates to a non-aqueous secondary battery having a spirally-wound electrode group in which a positive electrode plate and a negative electrode plate are placed facing towards each other and spirally wound, wherein at least one of the positive electrode plate and the negative electrode plate includes the aforesaid combined electrode plate.

The present invention further relates to a non-aqueous secondary battery including a spirally-wound electrode group in which a first electrode plate and a second electrode plate are placed facing towards each other and spirally wound, wherein a surface of the first electrode plate facing towards the second electrode plate has a first porous membrane, a surface of the second electrode plate facing towards the first electrode plate has a second porous membrane, the first porous membrane contains metal oxide particles and a first binder, and the second porous membrane contains resin particles and a second binder. In this spirally-wound non-aqueous secondary battery, the total thickness of the first porous membrane and the second porous membrane is preferably 15 to 25 µm.

The first electrode plate may be a positive electrode plate or a negative electrode plate. In the case of the first electrode plate being a positive electrode plate, the second electrode plate serves as a negative electrode plate. In the case of the first electrode plate being a negative electrode plate, the second electrode plate serves as a positive electrode plate.

According to the present invention, it is possible to provide a non-aqueous secondary battery having a capacity as high as that of a battery using a conventional resin separator and capable of ensuring safety even when the battery temperature abnormally increases or an external short-circuit occurs.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
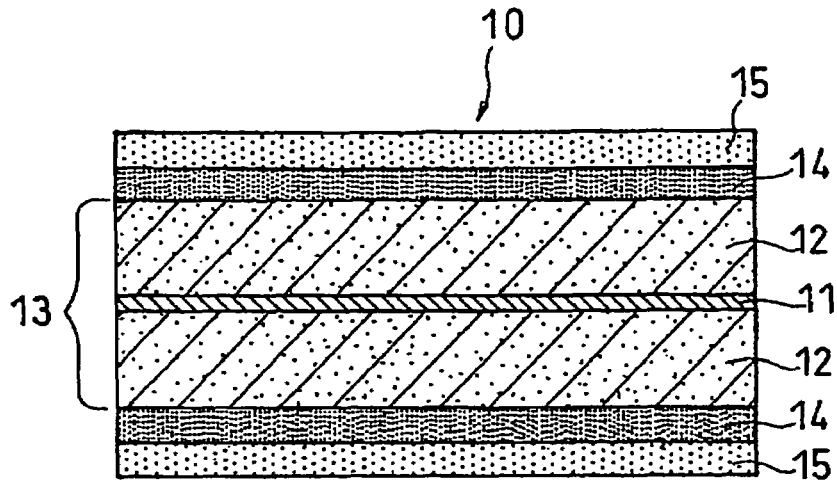
FIG. 1 is a vertical cross sectional view of a combined electrode plate in EXAMPLE of the present invention.

A description will first be given of a combined electrode plate for a spirally-wound electrode group for a non-aqueous secondary battery of the present invention.

The combined electrode plate of the present invention has a current collector, an active material layer carried on the current collector, and a multi-layer porous membrane carried on the active material layer.

The current collector is usually made of a metal foil, and any material conventionally known to those skilled in the art for the current collector for the electrode plate for a non-aqueous secondary battery can be used without any limitation. The metal foil may be subjected to any surface treatment, and it may be mechanically processed. The current collector usually has a strip shape before it is spirally wound and in the finished battery. The current collector for positive electrode plate is preferably made of Al or an Al alloy. The current collector for negative electrode plate is preferably made of Cu or a Cu alloy.

The active material layer contains a material mixture containing an active material as the essential component, and a binder, a conductive material and a thickener as optional components. The active material layer is usually formed by applying, onto the current collector, a paste prepared by dispersing the material mixture in a liquid component such as water, N-methyl-2-pyrrolidone (hereinafter referred to as NMP) or cyclohexanone, which is dried and then rolled.

Although the multi-layer porous membrane performs the same function as conventional separators, it is different from conventional separators in the following points. Firstly, the multi-layer porous membrane is carried on or adhered to the active material layer. Because the multi-layer porous membrane is carried on or adhered to the active material layer, it has extremely high resistance to thermal contraction and thermal deformation. Secondly, in the multi-layer porous membrane, the particles of the filler are bonded by a binder (binding agent) to form a structure, which differs from conventional separators obtained by drawing a resin sheet. As such, although the porous membrane has a lower tensile strength in the surface direction than the separators, the porous membrane is superior because, unlike the separators, it does not shrink due to heat even when it is exposed to a high temperature. The porous membrane prevents the extension of the short-circuited area when a short-circuit occurs or the battery is exposed to a high temperature, whereby the abnormal increase of the battery temperature is prevented.

The multi-layer porous membrane includes a first porous membrane and a second porous membrane. The first porous membrane contains metal oxide particles and a first binder. The second porous membrane contains resin particles and a second binder. With the use of such multi-layer porous membrane, it is possible to ensure safety even when the battery temperature abnormally increases or an external short-circuit occurs, while maintaining a high capacity as large as that of a battery using a conventional separator. More specifically, the first porous membrane containing metal oxide particles contributes to the prevention of extension of the short-circuited area during short-circuiting because it has resistance to contraction. Further, the second porous membrane containing resin particles exhibits the shut-down function during an overcharge because the resin particles melts at a certain temperature.

The spirally-wound non-aqueous secondary battery according to the technique of Patent Document 1 (Japanese Laid-Open Patent Publication No. Hei 2001-266828) cannot have a capacity as high as that of a battery using a conventional resin separator. In the combined electrode plate of the present invention, on the other hand, it is possible to form a multi-layer porous membrane which is relatively thin yet capable of withstanding the spirally-winding step. For this reason, a capacity as high as that of a battery using a conventional resin separator can be maintained. Additionally, according to the technique of Patent Document 1, the thermal contraction of the separator cannot be thoroughly prevented, but in the multi-layer porous membrane, a high level of safety can be maintained even during short-circuiting because the multi-layer porous membrane hardly contracts due to heat.

As the metal oxide particles contained in the first porous membrane, from the viewpoint of obtaining a porous membrane having high thermal resistance, preferred are alumina (aluminum oxide), silica (silicon oxide), zirconia (zirconium oxide), titania (titanium oxide) and magnesia (magnesium oxide). Particularly, from the viewpoint of obtaining excellent thermal resistance and electrochemical stability, alumina, titania and magnesia are preferred. The metal oxide particles may be used singly or in any combination of two or more.

The average particle size of the metal oxide particles is not specifically limited. Preferably, the primary particles have an average particle size of 0.01 to 1 μm, and the secondary particles have an average particle size of 0.3 to 3 μm. The term "secondary particle" used herein means an aggregate of a plurality of primary particles aggregated by the intermolecular force (van der Waals force), or a cluster having an indefinite shape made of a plurality (e.g. 2 to 10, preferably 3 to 5) of primary particles bonded together. Since the primary particles are usually monocrystalline, the cluster particles are always polycrystalline.

From the viewpoint of improving the porosity (the rate of micropore volume in the porous membrane) of the first porous membrane and the discharge characteristics of the battery, the metal oxide particles are preferably cluster particles of indefinite shape, each of which comprises a plurality of primary particles bonded together. The cluster particles preferably have a shape such as dendritic, coral-like or grape bunch-like. Because such cluster particles hardly form an excessively close-packed structure within the first porous membrane, they are suitable for forming an appropriate porous structure. The cluster particle includes a particle comprising a plurality of primary particles bonded together by melting and a particle comprising a plurality of growing crystals coalesced by contacting with each other during the growth of the crystal.

The primary particles preferably have an average particle size of not greater than 3 μm, more preferably not greater than 1 μm. When the primary particles have an average particle size of exceeding 3 μm, the first binder might be excess as the surface area of the metal oxide particles is decreased. It should be noted that, when primary particles cannot be identified clearly in the cluster particles, the particle size of the primary particles is defined by the thickest part of a knot of the cluster particle.

The average particle size of the primary particles can be determined by, for example, measuring the particle size of at least 10 primary particles using an SEM image or TEM image of polycrystalline particles, and then calculating the average thereof. When the primary particles are heated to be diffused and bonded to give cluster particles, the average particle size (volume based median size: D50) of the raw primary particles can be deemed as the average particle size of the primary particles constituting the cluster particles. In the heat treatment only to facilitate the diffusion and bonding, the average particle size of the primary particles hardly changes.

The secondary particles (aggregates or cluster particles) preferably have an average particle size twice or more that of the primary particles, and not greater than 10 μm, more preferably not greater than 3 μm. The average particle size (volume based median size: D50) of the secondary particles can be measured by, for example, a wet type laser particle size distribution analyzer manufactured by Microtrac Inc. When the secondary particles have an average particle size less than twice that of the primary particles, the first porous membrane might have an excessively close-packed structure. When the secondary particles have an average particle size of exceeding 10 μm, the porosity of the first porous membrane might be excess, making the structure of the first porous membrane brittle.

The method for obtaining the cluster particles is not specifically limited. For example, they are obtained by baking a metal oxide to form a mass and pulverizing the mass into an appropriate size. Alternatively, without performing the pulverization step, polycrystalline particles can be directly obtained by allowing growing crystals to contact with each other. For example, when α-alumina is baked to form a mass, which is then pulverized into an appropriate size to give cluster particles, the baking temperature is preferably 800 to 1300° C. The baking time is preferably 3 to 30 minutes. The pulverization of the mass can be done by a wet type grinding unit such as ball mill or a dry type grinding unit such as jet mill or jaw crusher. In this step, those skilled in the art can obtain cluster particles having a desired average particle size by appropriately adjusting the conditions for the pulverization.

The first binder is not specifically limited. For example, there can be used styrene butadiene rubber (SBR), modified SBR containing an acrylic acid unit or an acrylate unit, polyethylene, polytetrafluoroethylene (PTFE), polyvinylidene fluoride (PVDF), a tetrafluoroethylene-hexafluoropropylene copolymer (FEP), a polyacrylic acid derivative and a polyacrylonitrile derivative. The first binder may be used singly or in any combination of two or more. Among them, particularly preferred are a polyacrylic acid derivative and a polyacrylonitrile derivative. These derivatives preferably contain, in addition to an acrylic acid unit or/and an acrylonitrile unit, at least one selected from the group consisting of methyl acrylate unit, ethyl acrylate unit, methyl methacrylate unit and ethyl methacrylate unit. When rubber particles (e.g. SBR or its modified form) are used as the first binder, the first binder preferably further contains PVDF, carboxymethyl cellulose (CMC) or modified acrylonitrile rubber.

The amount of the first binder contained in the first porous membrane is preferably not less than 2 parts by weight and not greater than 20 parts by weight relative to 100 parts by weight of the metal oxide particles, more preferably, not less than 2 parts by weight and not greater than 10 parts by weight. When the amount of the first binder is too large, most of the micropores of the first porous membrane will be clogged by the first binder, decreasing the discharge characteristics. Conversely, when the amount of the first binder is too small, the structure of the first porous membrane might be brittle.

The first porous membrane preferably has a thickness of 2 to 15 μm. When the first porous membrane is too thick, the multi-layer porous membrane will be thick, making it difficult to maintain a high capacity. When the first porous membrane is too thin, the first porous membrane will not sufficiently exhibit the effect of preventing the short-circuited area from extending during short-circuiting.

As the resin particles contained in the second porous membrane, a thermoplastic resin having a melting point of 120 to 200° C. is preferred to use from the viewpoint of exhibiting the shut-down function. Among the thermoplastic resins, particularly preferred are polyolefin resins such as polyethylene, polypropylene and a copolymer of ethylene and propylene; vinyl acetate-containing resins such as a copolymer of ethylene and vinyl acetate and a copolymer of ethylene, propylene and vinyl acetate; polyacrylonitrile; a copolymer of an aromatic hydrocarbon having a vinyl group and a conjugated diene. The resin particles may be used singly or in any combination of two or more.

The average particle size of the resin particles is not specifically limited. Preferably, the primary particles have an average particle size of 0.01 to 1 μm, and the secondary particles have an average particle size of 0.3 to 3 μm. In this case also, the term "secondary particle" means an aggregate of a plurality of primary particles aggregated by the intermolecular force (van der Waals force), or a cluster having an indefinite shape made of a plurality (e.g. 2 to 10, preferably 3 to 5) of primary particles bonded together. The average particle size of the primary particles of the resin particles and that of the secondary particles of the same can be determined in the same manner as those of the metal oxide particles.

The cluster particles of the resin particles are suitable to form an appropriate porous structure because they hardly form an excessively close-packed structure within the second porous membrane. As the cluster particle, a particle comprising a plurality of primary particles bonded together by melting is preferred to use. The method for obtaining the cluster particle is not specifically limited. For example, the primary resin particles are heated with an appropriate temperature to partially melt the particles to form a mass, followed by pulverization into an appropriate size.

The second binder is not specifically limited. For example, those listed above as the first binder can be used. The second binder may be used singly or in any combination of two or more. The first and second binders may be the same or different.

The amount of the second binder contained in the second porous membrane is preferably not less than 2 parts by weight and not greater than 20 parts by weight relative to 100 parts by weight of the resin particles, more preferably not less than 2 parts by weight and not greater than 10 parts by weight. When the amount of the second binder is too large, most of the micropores of the second porous membrane might be clogged by the second binder, decreasing the discharge characteristics. Conversely, when the amount of the second binder is too small, the structure of the second porous membrane might be brittle.

The second porous membrane preferably has a thickness of 2 to 15 μm. When the second porous membrane is too thick, the multi-layer porous membrane will be thick, making it difficult to maintain a high capacity. When the second porous membrane is too thin, the second porous membrane may not sufficiently exhibit the shut-down effect.

When a separator is not used in the battery, the thickness of the multi-layer porous membrane, i.e. the total thickness of the first porous membrane and the second porous membrane, is preferably 15 to 25 μm. When a separator is used, the total thickness of the first porous membrane and the second porous membrane is preferably 4 to 10 μm.

In the combined electrode plate of the present invention, either of the first porous membrane and the second porous membrane may be in contact with the active material layer.

Hereinafter, a description will be given of a method for producing a combined electrode plate of the present invention. It is to be noted that the method for producing a combined electrode plate of the present invention is not limited to the following.

A method for producing a combined electrode plate includes the steps of: applying a first slurry containing metal oxide particles and a first binder onto the active material layer of an original electrode plate to form a first porous membrane, the original electrode plate comprising a current collector and an active material layer carried on the current collector; and applying a second slurry containing resin particles and a second binder onto the first porous membrane to form a second porous membrane. Alternatively, the second slurry may be applied onto the active material layer to form a second porous membrane, and the first slurry may be applied onto the second porous membrane to form a first porous membrane.

The term "original electrode plate" used herein means a precursor for the electrode plate before it is cut into a shape specified according to the battery size.

The first slurry containing the metal oxide particles and the first binder is prepared by mixing the metal oxide particles and the first binder with a liquid component (dispersing medium). Examples of the liquid component include, but not limited to, water, NMP and cyclohexanone. The metal oxide particles, the first binder and the dispersing medium can be mixed using a double arm kneader such as planetary mixer or a wet type disperser such as beads mill. The second slurry containing the resin particles and the second binder is prepared by in the same manner as the first slurry. The application of the first slurry or second slurry is preferably done by a comma roll coating method, gravure roll coating method or die coating method, but it is not limited thereto.

The active material layer on which the multi-layer porous membrane is formed is preferably adjusted in advance to have a desired design density through a rolling step. If an active material layer is rolled after the porous membrane is formed on the active material layer, the porosity of the porous membrane will be reduced, which might decrease the discharge characteristics of the battery. The rolling step reduces the surface asperities of the active material layer, and therefore it is advantageous in terms of forming the porous membrane uniformly. For this reason, the step of adjusting the density of the active material layer is preferably done before the first or second porous membrane is formed on the active material layer.

As for the method for forming the first or second porous membrane on the electrode plate, there are a spraying method using a nozzle, a printing method using a gravure roll, etc. In the case of the above-mentioned methods, the first porous membrane and the second porous membrane should be produced separately in different steps. In the case of a die nozzle application method, on the other hand, it is possible to simultaneously form a plurality of porous membranes, or to efficiently form just one membrane. The die nozzle application method is a technically superior process because the intrusion of water due to the exposure of a slurry to air can be prevented, which enables the stable formation of porous membranes which are stable in terms of amount and quality for long hours.

In the die nozzle application method, it is advantageous to simultaneously form a plurality of porous membranes from the viewpoint of reducing the production cost. Accordingly, the step of forming the first porous membrane and the step of forming the second porous membrane are preferably performed simultaneously. This can be achieved by using a two-slit die nozzle having two slits capable of simultaneously ejecting two different slurries.

The first and second slurries can be introduced into the two-slit die nozzle by, for example, using a precision pump. The two slits positioned parallel to each other simultaneously eject the first slurry and the second slurry, respectively, during which the current collector carrying the active material layer, to which the slurries are applied, is conveyed in a given direction. Accordingly, the slurry ejected from the slit in the rearward position relative to the direction in which the active material layer is conveyed will be underneath, and that ejected from the slit in the forward position relative to the same will be on top.

Hereinafter, a description will be given of a spirally-wound non-aqueous secondary battery of the present invention.

A spirally-wound non-aqueous secondary battery has an electrode group in which a positive electrode plate and a negative electrode plate are placed facing towards each other and spirally wound. The positive and negative electrodes are spirally wound optionally with or without a separator interposed therebetween. In such spirally-wound non-aqueous secondary battery, by replacing at least one of the positive electrode plate and the negative electrode plate with the combined electrode plate described above, a non-aqueous secondary battery of the present invention having resistance to short-circuiting and having the shut-down function can be obtained.

The non-aqueous secondary battery having resistance to short-circuiting and having the shut-down function can be formed also by forming the first porous membrane containing the metal oxide particles on the surface of one electrode plate, and the second porous membrane containing the resin particles on the surface of the other electrode plate. In other words, in the combined electrode plate of the present invention, the first porous membrane and the second porous membrane are laminated together whereas, in the non-aqueous secondary battery of the present invention, the first porous membrane and the second porous membrane are not necessarily laminated together. The first porous membrane may be carried on the active material layer of one electrode plate, and the second porous membrane may be carried on the active material layer of the other electrode plate.

The non-aqueous secondary battery in which the first porous membrane is carried on the active material layer of one electrode plate and the second porous membrane is carried on the active material layer of the other electrode plate can be obtained by, for example, spirally winding a positive electrode plate having the first porous membrane only and a negative electrode plate having the second porous membrane only, or a negative electrode plate having the first porous membrane only and a positive electrode plate having the second porous membrane only. A separator may or may not be interposed between the positive and negative electrodes. When a separator is not interposed, the total thickness of the first porous membrane and the second porous membrane is preferably 15 to 25 μm. When a separator is interposed, the total thickness of the first porous membrane and the second porous membrane is preferably 4 to 10 μm.

As for the method for forming the first porous membrane on the active material layer of one electrode plate and the second porous membrane on the active material layer of the other electrode plate, similar to the case of the combined electrode plate, a spraying method using a nozzle, a printing method using a gravure roll, a die nozzle application method or the like can be employed.

The separator is preferably a microporous film prepared by molding a resin or a resin composite into a sheet, followed by drawing. The resin serving as the raw material for the separator is not specifically limited. Examples thereof include polyolefin resins such as polyethylene and polypropylene, polyamide, polyethylene terephthalate (PET), polyamideimide and polyimide.

The positive electrode active material is not specifically limited. Preferred is a composite oxide containing lithium and a transition metal. The composite oxide containing lithium and a transition metal is not specifically limited. Preferred are lithium cobalt oxide ($LiCoO_2$); a modified form of lithium cobalt oxide in which cobalt is partially replaced with other element; lithium nickel oxide ($LiNiO_2$); a modified form of lithium nickel oxide in which nickel is partially replaced with other element; lithium manganese oxide ($LiMn_2O_4$); a modified form of lithium manganese oxide in which manganese is partially replaced with other element; any of the above-listed oxides in which Co, Ni or Mn is partially replaced with other transition metal element, or with a metal such as aluminum or magnesium; and an iron compound containing iron as the main constituent element (olivine oxide). They may be used singly or in any combination of two or more.

The positive electrode binder is not specifically limited. There can be used polytetrafluoroethylene (PTFE), a modified form of PTFE, polyvinylidene fluoride (PVDF), a modified form of PVDF, or rubber particles of a derivative of polyacrylic acid (e.g. BM-500B (trade name) available from Zeon Corporation, Japan). They may be used singly or in any combination of two or more. PTFE and BM-500B is preferably used with a thickener. As the thickener, preferred are CMC, polyethylene oxide (PEO), and a modified acrylonitrile rubber (e.g. BM-720H (trade name) available from Zeon Corporation, Japan).

As the conductive material contained in the active material layer, acetylene black, ketjen black or any graphite can be used. They may be used singly or in any combination of two or more.

The negative electrode active material is not specifically limited. There can be used a carbon material such as any natural graphite, any artificial graphite, petroleum coke, carbon fiber or a baked organic polymer; an oxide; siliside; a tin-containing composite material; a silicon-containing composite material; any metal (e.g. silicon or lithium); or an alloy material (e.g. a silicon alloy or a lithium alloy). They may be used singly or in any combination of two or more.

The negative electrode binder is not specifically limited. Preferred are rubber particles because a small amount thereof can achieve sufficient binding. In particular, those containing a styrene unit and a butadiene unit are preferred. Examples include a styrene-butadiene copolymer (SBR) and a modified form of SBR containing an acrylic acid unit or an acrylate unit. They may be used singly or in any combination of two or more. When rubber particles are used as the negative electrode binder, a thickener made of a water soluble polymer is preferably used with the rubber particles. As the water soluble polymer, preferred is a cellulose resin, particularly, CMC is preferred. The amount of the rubber particles or the thickener contained in the negative electrode is preferably 0.1 to 5 parts by weight relative to 100 parts by weight of the negative electrode active material. Besides the above, PVDF, a modified form of PVDF or the like can also be used as the negative electrode binder.

In the non-aqueous secondary battery, an electrolyte prepared by dissolving a lithium salt in a non-aqueous solvent is preferably used. The concentration of the lithium salt dissolved in the electrolyte is usually 0.5 to 2 mol/L. As the lithium salt, preferably used is lithium hexafluorophosphate ($LiPF_6$), lithium perchlorate ($LiClO_4$) or lithium tetrafluoroborate ($LiBF_4$). They may be used singly or in any combination of two or more.

As the non-aqueous solvent, examples thereof include, but not limited to, carbonic acid esters such as ethylene carbonate (EC), propylene carbonate (PC), dimethyl carbonate (DMC), diethyl carbonate (DEC) and ethyl methyl carbonate (EMC); carboxylic acid esters such as γ-butyrolactone and γ-valerolactone; and any ether. The non-aqueous solvent is preferably made of a combination of two or more.

Hereinafter, a description will be given of examples of the present invention. It is to be understood that the following are given merely as examples of the present invention and the present invention is not limited thereto.

EXAMPLE 1

(i) Preparation of First Slurry

To 100 parts by weight of alumina particles (metal oxide particles) with an average primary particle size of about 0.1 μm were added 4 parts by weight of a modified acrylonitrile rubber (first binder) and an appropriate amount of N-methyl-2-pyrrolidone (NMP: dispersing medium), which were mixed with a stirrer. The resulting mixture was introduced into a beads mill with an internal volume of 0.6 L, 80% of which was filled with zirconia beads having a diameter of 0.2 mm so as to allow the alumina particles to thoroughly disperse in the mixture to give a first slurry. The modified acrylonitrile rubber used here was BM-720H (trade name) available from Zeon Corporation, Japan.

(ii) Preparation of Second Slurry

To 100 parts by weight of polyethylene particles (resin particles) with an average primary particle size of about 0.5 μm were added 10 parts by weight of a polyacrylic acid derivative (second binder) and an appropriate amount of N-methyl-2-pyrrolidone (NMP: dispersing medium), which were mixed with a stirrer. The resulting mixture was introduced into a beads mill with an internal volume of 0.6 L, 80% of which was filled with zirconia beads having a diameter of 0.2 μm so as to allow the polyethylene particles to thoroughly disperse in the mixture to give a second slurry. The polyacrylic acid derivative used here was BM-500B (trade name) available from Zeon Corporation, Japan.

(iii) Production of Electrode Plate

As shown in FIG. 1, onto both surfaces of a 10 μm thick current collector 11 made of a copper foil was applied a paste prepared by dispersing an electrode material mixture containing graphite (active material) and BM-500B (binder) in an aqueous solution of 1 wt % carboxymethyl cellulose, followed by drying. The dried coating films were rolled to form active material layers. The amount of the binder contained in the electrode material mixture was 2 parts by weight relative to 100 parts by weight of the graphite. Thereby, an electrode plate 13 having active material layers 12, each with a thickness of 80 μm, on both sides thereof was produced. The active material layer had a density of 1.4 g/cm$^3$.

(iv) Production of Combined Negative Electrode Plate

Using the two different slurries prepared above, a combined negative electrode plate having multi-layer porous membranes as shown in FIG. 1 was produced by the procedure below.

Figure 2:
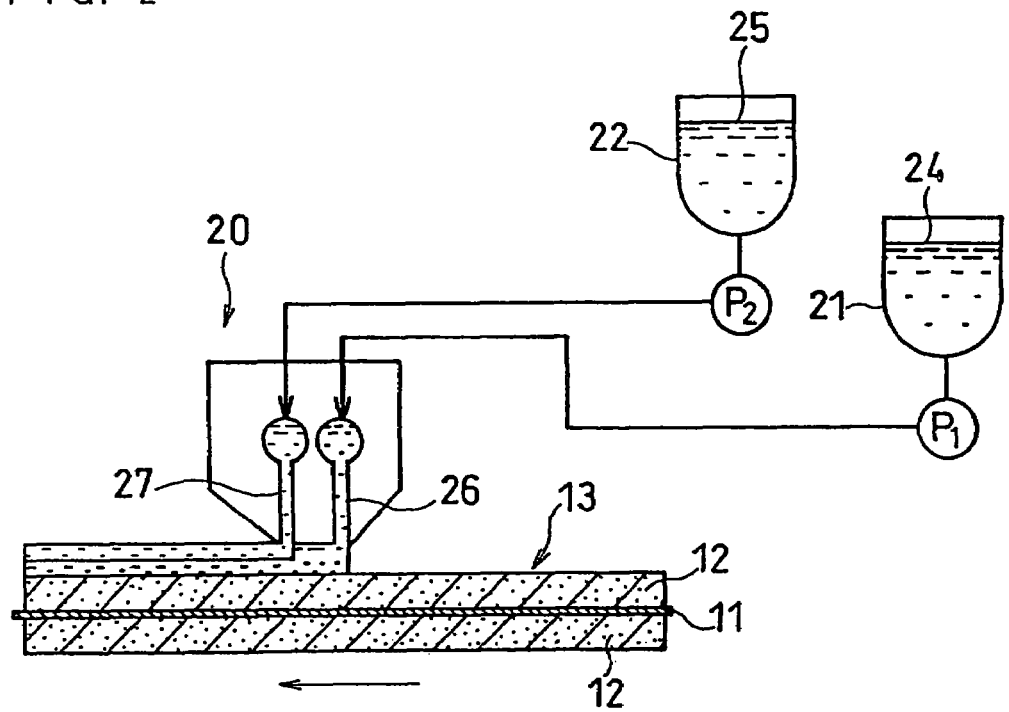
FIG. 2 is a diagram schematically illustrating a two-slit die nozzle and how to form a porous membrane on an electrode plate using the two-slit die nozzle.

The two different slurries were simultaneously applied onto the electrode plate produced above using a two-slit die nozzle as shown in FIG. 2 such that the first slurry was underneath and that the second slurry was on top, followed by drying to give a combined electrode plate 10 having two-layer structured multi-layer porous membranes thereon. The first porous membrane 14 containing the alumina particles had a thickness of 15 μm. The second porous membrane 15 containing the polyethylene particles had a thickness of 5 μm. The total thickness (i.e. the thickness of each multi-layer porous membrane) was 20 μm.

FIG. 2 schematically shows how to simultaneously form the first porous membrane 14 and the second porous membrane 15 on the active material layer 12 of the electrode plate 13 by the two-slit die nozzle 20. The first slurry 24 containing the alumina particles is held in a container 21, and the second slurry 25 containing the polyethylene particles is held in a container 22. These slurries are sent to the two-slit die nozzle 20 by pumps $P_1$ and $P_2$. The first slurry and the second slurry are ejected from a first nozzle 26 and a second nozzle 27, respectively, onto the electrode plate 13 which is conveyed in the direction indicated by the arrow in FIG. 2.

EXAMPLE 2

A combined electrode plate was produced in the same manner as in EXAMPLE 1 except that the first porous membrane had a thickness of 10 μm.

EXAMPLE 3

A combined electrode plate was produced in the same manner as in EXAMPLE 1 except that the first porous membrane had a thickness of 20 μm.

REFERENCE EXAMPLE 1

A combined electrode plate was produced in the same manner as in EXAMPLE 1 except that the first porous membrane had a thickness of 5 μm.

REFERENCE EXAMPLE 2

A combined electrode plate was produced in the same manner as in EXAMPLE 1 except that the first porous membrane had a thickness of 30 μm.

EXAMPLE 4

The alumina particles used in EXAMPLE 1 were baked at 1200° C., which were pulverized using a wet type ball mill containing alumina balls having a diameter of 15 mm. The resulting secondary particles of alumina were cluster particles having an indefinite shape in which a plurality of original primary particles were bonded together. They had a dendritic shape or coral-like shape. The cluster particles had an average particle size of about 0.5 μm.

Figure 3:
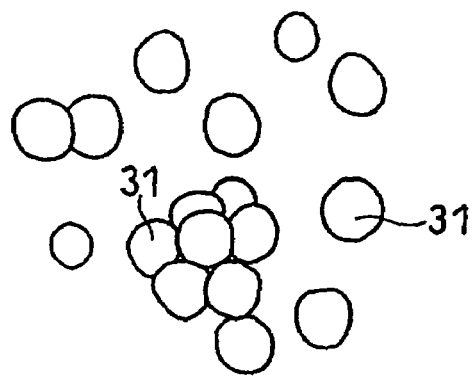
FIG. 3 is a diagram of a filler consisting of primary particles used for a porous membrane.
Figure 4:
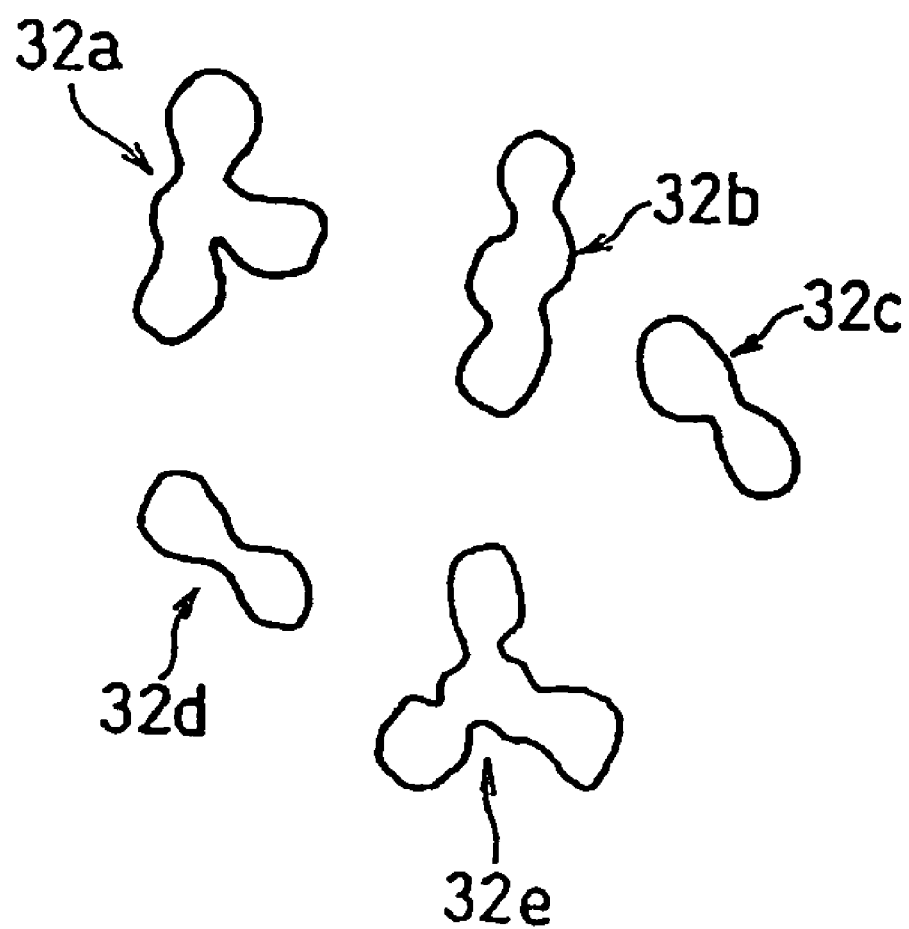
FIG. 4 is a diagram of a filler consisting of aggregates, each made of bonded particles, used for a porous membrane.

FIG. 3 is a diagram schematically showing the original primary particles 31. FIG. 4 is a diagram schematically showing the cluster particles 32a to 32e, each of which comprises a plurality of original primary particles bonded together.

A combined electrode plate was produced in the same manner as in EXAMPLE 1 except that the thus-prepared cluster particles having an average particle size of about 0.5 μm were used as the metal oxide particles.

EXAMPLE 5

The polyethylene particles used in EXAMPLE 1 were partially melted at 200° C. and then cooled to form a mass. The resulting mass was pulverized using a wet type ball mill containing alumina balls having a diameter of 15 mm. The resulting secondary particles of polyethylene were cluster particles having an indefinite shape in which a plurality of original primary particles were bonded together as shown in FIG. 4. The cluster particles had an average particle size of about 2 μm.

A combined electrode plate was produced in the same manner as in EXAMPLE 1 except that the thus-prepared cluster particles having an average particle size of about 2 μm were used as the resin particles.

COMPARATIVE EXAMPLE 1

A combined electrode plate was produced in the same manner as in EXAMPLE 1 except that the first slurry of EXAMPLE 1 containing the alumina particles was used, and that only first porous membranes, each having a thickness of 20 μm, were formed on the electrode plate.

COMPARATIVE EXAMPLE 2

A combined electrode plate was produced in the same manner as in EXAMPLE 1 except that the second slurry of EXAMPLE 1 containing the polyethylene particles was used, and that only second porous membranes, each having a thickness of 20 μm, were formed on the electrode plate.

(Production of Battery)

Non-aqueous electrolyte secondary batteries were produced in the manner described below using the combined electrode plates produced above as the negative electrode plate.

Onto both surfaces of an aluminum foil was applied a paste prepared by dispersing, in NMP, a positive electrode material mixture containing lithium cobalt oxide (positive electrode active material) and polyvinylidene fluoride (PVDF: positive electrode binder), followed by drying. The dried coating films were rolled to form positive electrode active material layers. The amount of the binder contained in the positive electrode material mixture was 2 parts by weight relative to 100 parts by weight of lithium cobalt oxide. Further, as the conductive material, 2 parts by weight of carbon black was added to the positive electrode material mixture. Thereby, a positive electrode plate having positive electrode active material layers, each with a thickness of 80 μm, on both sides thereof was produced.

The negative electrode plate (combined electrode plate) and the positive electrode plate were spirally wound to fabricate an electrode group. A separator was not used. The electrode group was housed in a battery case having an outer diameter of 18 mm and a length of 65 mm, and made of an iron can plated with nickel, whereby a cylindrical battery having a nominal capacity of 2 Ah was produced for testing. The electrolyte used here was prepared by dissolving $LiPF_6$ in a non-aqueous solvent mixture of ethylene carbonate, diethyl carbonate and ethyl methyl carbonate at a volume ratio of 1:1:1 at a $LiPF_6$ concentration of 1 mol/L.

(Evaluation)

The combined electrode plates produced in EXAMPLEs, REFERENCE EXAMPLEs and COMPARATIVE EXAMPLEs and the batteries containing the same were subjected to the following evaluation tests.

[Porosity of Porous Membrane]

The negative electrode before the formation of the porous membrane and that after the formation of the porous membrane were cut into a predetermined size. The weight of the porous membrane was determined from the weight difference between them. From the weight of the porous membrane, the specific gravity of the materials (particles and binder) contained in the porous membrane, and the composition ratio of the same, the theoretical volume (A) of the porous membrane was calculated. Meanwhile, the thickness of the porous membrane was determined from the thickness difference between the negative electrode before the formation of the porous membrane and that after the formation of the porous membrane, which was then multiplied by the cutting size to yield the apparent volume (B) of the porous membrane. Using the theoretical volume A and the apparent volume B, the porosity (C) of the porous membrane was calculated by the following equation: $C=(B-A)/B \times 100$ (%).

[OCV (Open Circuit Voltage) of Battery]

Using the test batteries using the negative electrode plates, 20 of each, the open circuit voltage (OCV) was measured 2 hours after the injection of the electrolyte. The battery having an OCV of 0±20 mV was deemed as a battery having a short-circuit failure. Then, the failure rate was calculated in percentage.

[Battery Charge-Discharge Characteristics]

The test batteries were subjected to initial charge/discharge where charging was performed at a constant current of 100 mA up to 4.1 V and discharging was performed at a constant current of 200 mA down to 3.0 V. They were then stored in an atmosphere of 45° C. for 7 days, and again subjected to the following charge/discharge.

(1) Charging: At a constant current of 1400 mA to 4.2 V, and then at a constant voltage of 4.2 V to a current of 100 mA.
   Discharging: At a current of 400 mA with an end-of-voltage of 3 V.
(2) Charging: The same as (1) above.
   Discharging: At a current of 4000 mA with an end-of-voltage of 3 V.

The rate of the discharge capacity obtained under the conditions of (2) above to the discharge capacity obtained under the conditions of (1) above was calculated in percentage.

[Overcharge Characteristics]

The batteries in a discharged state having been subjected to the above charge/discharge test were overcharged at 2000 mA for 84 minutes to 2.8 Ah, i.e. to about 1.4 times the nominal capacity. Subsequently, temperature rise was measured using a thermocouple arranged in the battery can to determine the maximum temperature.

[External Short-Circuit Resistance]

The batteries having been subjected to the above charge/discharge test were again charged under the same condition as (1) above. Subsequently, they were pierced by a round nail made of iron at a rate of 10 mm per second, after which temperature rise was measured using a thermocouple arranged in the battery can to determine the maximum temperature.

The results obtained from the above tests are shown in Table 1.

TABLE 1

|  | First porous membrane (μm) | Second porous membrane (μm) | Porosity (%) | OCV failure rate (%) | Discharge capacity ratio 4000 mA/400 mA (%) | Maximum temperature during overcharge (° C.) | Maximum temperature during short-circuit (° C.) |
|---|---|---|---|---|---|---|---|
| Ex. 1 | 15 | 5 | 48 | 0 | 83 | 83 | 85 |
| Ex. 2 | 10 | 5 | 47 | 0 | 81 | 87 | 91 |
| Ex. 3 | 20 | 5 | 49 | 0 | 84 | 85 | 84 |

TABLE 1-continued

|  | First porous membrane (μm) | Second porous membrane (μm) | Porosity (%) | OCV failure rate (%) | Discharge capacity ratio 4000 mA/400 mA (%) | Maximum temperature during overcharge (° C.) | Maximum temperature during short-circuit (° C.) |
|---|---|---|---|---|---|---|---|
| Ex. 4 | 15* | 5 | 61 | 0 | 88 | 87 | 88 |
| Ex. 5 | 15 | 5* | 54 | 0 | 86 | 81 | 86 |
| Comp. Ex. 1 | 20 | — | 47 | 0 | 82 | 123 | 81 |
| Comp. Ex. 2 | — | 20 | 49 | 0 | 83 | 84 | 126 |
| Ref. Ex. 1 | 5 | 5 | 48 | 30 | 77 | 88 | 93 |
| Ref. Ex. 2 | 30 | 5 | 50 | 15 | 76 | 91 | 85 |

Note:
the value with an asterisk (*) represents the value for the secondary particles.

In the battery of COMPARATIVE EXAMPLE 1 having only the first porous membrane containing the alumina particles as the porous membrane, there was no problem in terms of external short circuit resistance, but the overcharge characteristics thereof was reduced. Presumably, this is because the use of only metal oxide particles cannot offer the shutdown function, which has been described earlier. Likewise, in the battery of COMPARATIVE EXAMPLE 2 having only the second porous membrane containing the polyethylene particles, there was no problem in terms of overcharge characteristics, but the external short circuit resistance was reduced. Presumably, this is because the use of only resin particles cannot prevent the short-circuiting area from extending along with the short-circuiting.

In contrast to the batteries of COMPARATIVE EXAMPLEs, the battery of EXAMPLE 1 having both the first porous membrane containing the metal oxide particles and the second porous membrane containing the resin particles exhibited satisfactory results both in terms of overcharge characteristics and external short-circuit resistance. When the total thickness of the first and second porous membranes was less than 15 μm (REFERENCE EXAMPLE 1), however, the distance between the positive and negative electrodes became excessively small. As a result, the short-circuit failure rate increased and the discharge characteristics slightly decreased. The decrease of the discharge characteristics is due to a decrease in the retention of electrolyte by the porous membrane. Conversely, when the total thickness of the first and second porous membranes exceeded 25 μm (REFERENCE EXAMPLE 2), because the resulting combined electrode plate was too thick, the combined electrode plate was stressed during the insertion of the electrode group into the battery can. As a result, the short-circuit failure rate increased and the discharge characteristics slightly decreased. Such decrease of the discharge characteristics is due to an increase of the resistance component resulting from the increase of the distance between the positive and negative electrodes. Accordingly, the foregoing shows that it is more preferred that the total thickness of the porous membrane be 15 to 25 μm.

As for the batteries of EXAMPLEs 4 and 5 using the secondary particles comprising a plurality of particles bonded together, the capacity at the time of discharging at 4000 mA was improved along with the increase of the porosity of the porous membrane. Presumably, this is because the microporous volume of the porous membrane is likely to be ensured by the bonding of a plurality of primary particles, which has been described earlier.

The combined electrode plate of the present invention is suitable to produce a high-capacity non-aqueous secondary battery having excellent overcharge characteristics and excellent external short-circuit resistance. The non-aqueous secondary battery of the present invention has a wide range of applications including portable equipment.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A combined electrode plate for a spirally-wound electrode group for a non-aqueous secondary battery comprising a current collector, an active material layer carried on said current collector and a multi-layer porous membrane carried on said active material layer, wherein
said multi-layer porous membrane comprises a first porous membrane and a second porous membrane,
said first porous membrane comprises metal oxide particles and a first binder,
said second porous membrane comprises resin particles and a second binder,
said multi-layer porous membrane has a thickness of 15 to 25 μm,
said first porous membrane has a thickness of 2 to 15 μm,
said second porous membrane has a thickness of 2 to 15 μm,
primary particles of said metal oxide particles have an average particle size of 0.1 to 1 μm,
secondary particles of said metal oxide particles have an average particle size of 0.3 to 3 μm, and
said secondary particles comprise a cluster having an indefinite shape comprising a plurality of primary particles bonded together.

2. A non-aqueous secondary battery comprising a spirally-wound electrode group in which a positive electrode plate and a negative electrode plate are placed facing towards each other and spirally wound, wherein at least one of said positive electrode plate and said negative electrode plate comprises the combined electrode plate in accordance with claim 1.

3. The combined electrode plate for a spirally-wound electrode group for a non-aqueous secondary battery in accordance with claim 1, wherein
primary particles of said resin particles have an average particle size of 0.01 to 1 μm.

4. The combined electrode plate for a spirally-wound electrode group for a non-aqueous secondary battery in accordance with claim 1, wherein
said second binder is contained in said second porous membrane in an amount of 2 to 10 parts by weight relative to 100 parts by weight of said resin particles.

* * * * *